United States Patent
Gagnon

(10) Patent No.: US 8,885,699 B2
(45) Date of Patent: *Nov. 11, 2014

(54) COMPENSATION FACTOR REDUCTION IN AN UNROLLED DECISION FEEDBACK EQUALIZER

(71) Applicant: PMC-Sierra US, Inc., Sunnyvale, CA (US)

(72) Inventor: Mathieu Gagnon, Verdun (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/157,000

(22) Filed: Jan. 16, 2014

(65) Prior Publication Data

US 2014/0133544 A1 May 15, 2014

Related U.S. Application Data

(63) Continuation of application No. 13/347,092, filed on Jan. 10, 2012.

(51) Int. Cl.
*H03H 7/30* (2006.01)
*H04L 25/03* (2006.01)

(52) U.S. Cl.
CPC .............................. *H04L 25/03057* (2013.01)
USPC ........... 375/233; 375/348; 375/349; 375/346; 375/232; 708/323

(58) Field of Classification Search
USPC ........... 375/348, 349, 346, 233, 232; 708/323
See application file for complete search history.

(56) References Cited

U.S. PATENT DOCUMENTS

| | | | |
|---|---|---|---|
| 5,594,756 A | 1/1997 | Sakurai et al. | |
| 5,825,744 A | 10/1998 | Hutchins et al. | |
| 5,946,349 A | 8/1999 | Raghunath | |
| 6,304,598 B1 | 10/2001 | Agazzi et al. | |
| 6,370,190 B1 | 4/2002 | Young et al. | |
| 6,466,616 B1 | 10/2002 | Senstrom et al. | |
| 6,661,847 B1 | 12/2003 | Davis et al. | |
| 6,898,238 B2 | 5/2005 | Agazzi et al. | |
| 7,602,860 B2 | 10/2009 | Hietala et al. | |
| 7,616,700 B2 | 11/2009 | Kim et al. | |
| 8,379,711 B2 * | 2/2013 | Aziz et al. | 375/233 |
| 2008/0069199 A1 * | 3/2008 | Chen et al. | 375/233 |
| 2009/0285277 A1 | 11/2009 | Sunaga et al. | |

OTHER PUBLICATIONS

Kasturia, "Techniques for High-Speed Implementations of Nonlinear Cancellation", IEEE Journal on Selected Areas in Communications, vol. 9, No. 5, Jun. 1991, pp. 711-717.

(Continued)

*Primary Examiner* — Rahel Guarino
(74) *Attorney, Agent, or Firm* — Dennis R. Haszko

(57) ABSTRACT

An unrolled decision feedback equalizer (DFE) as disclosed herein has a reduced number of compensation factors while keeping a suitable performance level for a given application. The $K^N$ possible DFE correction levels are reduced or compressed into fewer levels (R), merging together the levels that are the closest together where K represents the number of possible symbols in each baud, or the number of bits encoded into each baud, and N represents the DFE depth in number of bauds. A mapping function is then provided to convert the $K^N$ combinations of previous history bits into R sampler selections.

22 Claims, 16 Drawing Sheets

(56) References Cited

OTHER PUBLICATIONS

Max, "Quantizing for Minimum Distortion", IRE Transactions on Information Theory, Mar. 1960, pp. 7-12.

Lloyd, "Least Squares Quantization in PCM", IEEE Transactions on Information Theory, vol. IT-28, No. 2, Mar. 1982, pp. 129-137.

Kim et al., "Equalizer Design and Performance Trade-Offs in ADC-Based Serial Links", IEEE Transactions on Circuits and Systems—1: Regular Papers, vol. 58, No. 9, Sep. 2011, pp. 2096-2107.

Kim et al., "Equalizer Design and Performance Trade-Offs in ADC-Based Serial Links", IEEE, 2010, 8 pages.

Notice of Allowance, U.S. Appl. No. 13/347,092, filed Jan. 6, 2014, 10 pages.

* cited by examiner

| INDEX OF $\tilde{T}$ | $\tilde{T}$ |
|---|---|
| 7 | -11 |
| 6 | -8 |
| 5 | -5 |
| 4 | -1.667 |
| 3 | +1.667 |
| 2 | +5 |
| 1 | +8 |
| 0 | +11 |

COMPENSATION FACTOR REDUCTION IN AN UNROLLED DECISION FEEDBACK EQUALIZER

CROSS REFERENCE TO RELATED APPLICATIONS

This application is a continuation of U.S. patent application Ser. No. 13/347,092, filed Jan. 10, 2012, which is incorporated herein by reference in its entirety.

FIELD

The present disclosure relates to signal processing in data networking and communications applications, and more specifically to decision feedback equalizers, a class of non-linear filters.

BACKGROUND

Decision Feedback Equalizers (DFEs) are used in digital telecommunication systems to remove the effects of inter-symbol interference (ISI) caused by linear, or even non-linear, distortions present in the channel, transmit and receive devices.

The DFE operates by subtracting a compensation factor from the incoming, distorted signal. This compensation factor is a weighted sum of past digital decisions, and varies for each input signal instance. Practical DFEs use a limited number of past digital decisions to compute the current compensation factor. There are thus a finite number of compensation factors that can be applied, limited by the number of digital combinations that are allowed by the number of past decisions used to generate the compensation factor for each baud received.

Many different implementations exist for these equalizers. Of particular interest for this disclosure is the unrolled DFE, such as described in S. Kasturia, Techniques for High-Speed Implementations of Nonlinear Cancellation, IEEE Journal on Selected Areas in Communication, Vol. 9, No. 5, June 1991, which is incorporated herein by reference.

The unrolled DFE structure, instead of collecting the input signal and subtracting the compensation factor from it, pre-computes all the possible compensation factors, and each of them is applied as a decision threshold for a single sampler.

This thus requires as many samplers as there are possible decision thresholds. As a result, one digitized output is produced per sampler, that is, one digitized output per compensation factor. These outputs correspond to possible DFE decisions, each being the correct decision for the current bit given a certain previous history. The DFE then selects which of these outputs corresponds to the correct threshold according to the previous decisions. This simplifies the processing in comparison to a system that computes the DFE compensation from digitized samples of an analog-to-digital (A/D) converter, as the subtraction of the compensation is already performed at the sampling head.

Known implementations of DFEs suffer from an exponential increase in complexity as the number of previous decisions used to compute the current threshold (the DFE depth) is increased.

When compared to systems where the input is first sampled by an ADC and the equalization is computed from the digitized input code, unrolled DFEs can reduce the number of samplers required when the DFE depth is small. However, since the number of samplers required grows exponentially with the DFE depth, this advantage quickly disappears as a larger equalization depth is required.

This reduces the benefits of the simpler computation required by unrolled DFE systems, and limits their application to a small DFE depth.

Improvements in unrolled DFE performance are desirable.

BRIEF DESCRIPTION OF THE DRAWINGS

Embodiments of the present disclosure will now be described, by way of example only, with reference to the attached Figures.

FIG. 8 illustrates a reduced list of thresholds and their indexes according to an embodiment of the present disclosure.

DETAILED DESCRIPTION

Figure 1:
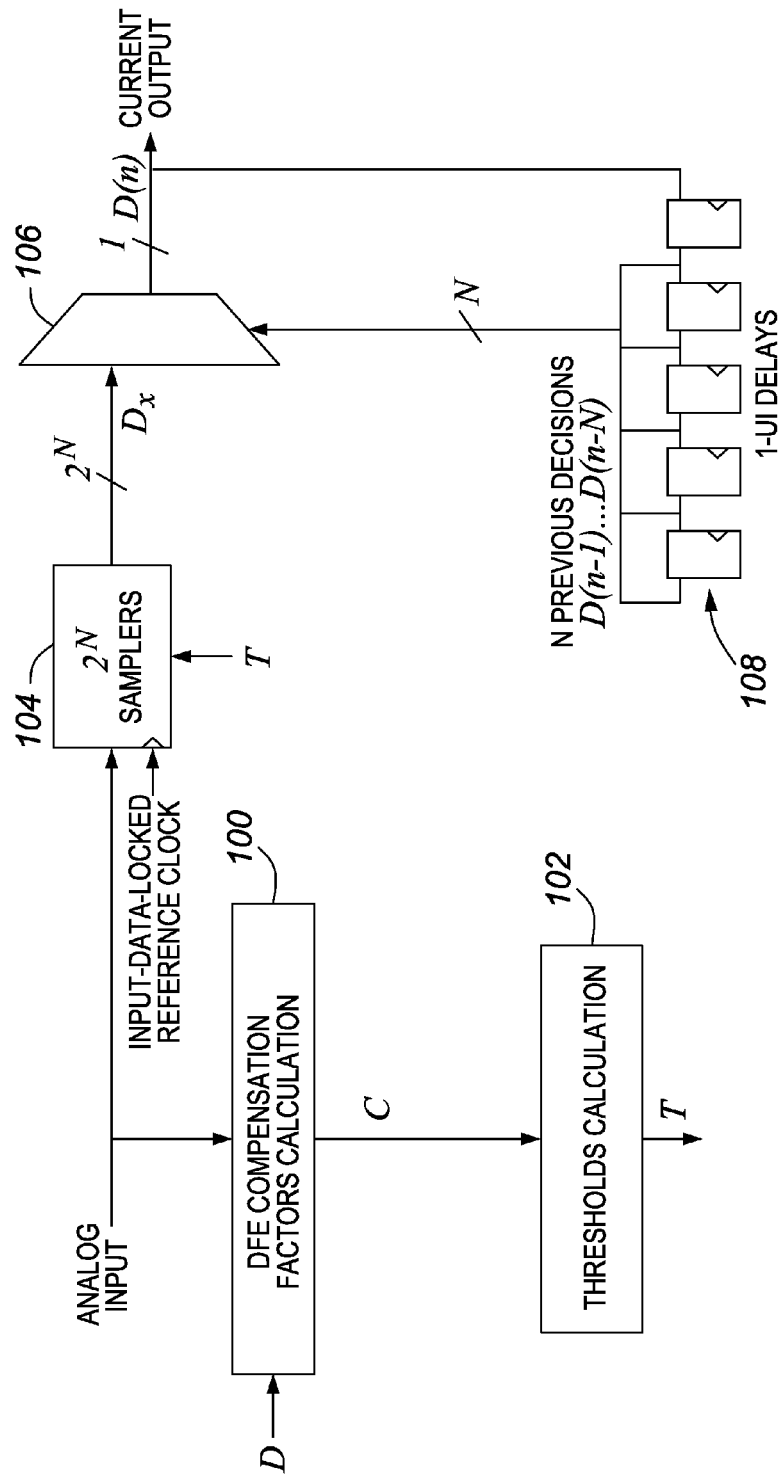
FIG. 1 illustrates a known unrolled DFE.

An unrolled DFE as disclosed herein has a reduced number of compensation factors while keeping a suitable performance level for a given application. The $K^N$ possible DFE correction levels are reduced or compressed into fewer levels (R), merging together the levels that are the closest together. Here K represents the number of possible symbols in each baud, or the number of bits encoded into each baud, and N represents the DFE depth in number of bauds. A mapping function is then provided to convert the $K^N$ combinations of previous history bits into R sampler selections.

In an embodiment, the present disclosure provides a method of operating an unrolled DFE having a plurality of input samplers. The method includes the following steps: a) creating a reduced set of compensation factors (R) based on an original set of compensation factors ($K^N$) for the unrolled DFE, where $R<K^N$; b) applying the reduced set of compensation factors as input sampler thresholds for the plurality of input samplers to generate a reduced set of unrolled DFE decisions, the number of input samplers being no more than R; and c) selecting an appropriate DFE decision from the reduced set of unrolled DFE decisions based upon previous bit values and in accordance with a mapping table.

In an example embodiment, step a) includes: a0) merging the original set of compensation factors until their number reaches a pre-defined target R and keeping track of which levels in the original set of compensation factors were merged together. In an example embodiment, step a) includes: a1) computing a mapping function to map between the previous bit values and the new input sampler thresholds; and creating the mapping table based on the mapping function. In an example embodiment, step b) includes: converting the reduced set of compensation factors into the input sampler thresholds; and assigning each of the input sampler thresholds to a sampling head of one of the plurality of input samplers.

In an example embodiment, the method further includes: sorting the original set of compensation factors by compensation factor value; selecting half ($K^N/2$) of the sorted set of compensation factors as a basis for creating the reduced set of compensation factors, using inherent symmetry found in the original set of compensation factors, where the reduced set of compensation factors after symmetry reduction, R/2, is less than $K^N/2$; and expanding the selected half of the sorted set of compensation factors and the mapping table to a full set of compensation factors and a final mapping table. In an example embodiment, if the original set of compensation factors lacks symmetry, the method includes: creating a symmetrical compensation factors list by averaging magnitudes of a non-symmetrical compensation factor list for indexes expected to be symmetrical, and keeping the original sign and offset.

In an example embodiment, to implement the DFE the method further includes: compacting a code resulting from the samplers into a smaller number of bits that represent the code; and using this compacted code as the input to a digital DFE decision tree, wherein the compensation factors are the mapping table values.

In an example embodiment, the reduced set of compensation factors are computed by using Lloyd-Max techniques to minimize the variance of the distribution of the error, assuming an equal probability of usage of the compensation factors. In an example embodiment, a known probability of usage of the compensation factors is used to further optimize the variance of the distribution of the error.

In an example embodiment, the reduced set of compensation factors includes compensation factors of a voltage-domain DFE. In another example embodiment, the reduced set of compensation factors includes compensation factors of a time-domain DFE, which select different sampling instants for the current sample according to previous decisions. In a further example embodiment, the compensation factors apply to both the time domain and the voltage domain. In such a particular example embodiment, the number of compensation factors is reduced by a method that takes into account simultaneously the error in the time and voltage domain, using a pre-defined conversion factor between the two, for example using Lloyd-Max techniques.

In an example embodiment, the final number of reduced compensation factors is iteratively adjusted down until a minimal performance criterion is met, and the mapping table is adjusted to take into account the extra unused samplers' outputs. In a particular example embodiment, DFE logic is adjusted to take into account the extra unused samplers' outputs, such as to discard the extra unused samplers' outputs.

In an example embodiment, the performance criterion is the inverse of the largest magnitude of the difference between the original compensation factors and the corresponding final reduced compensation factors. In another example embodiment, the performance criterion is the inverse of the root-sum square of the difference between the original compensation factors and the corresponding final reduced compensation factors. In an example embodiment, a maximal number of reduced compensation factors is pre-defined.

In an example embodiment, the method further includes powering down unused samplers.

In an example embodiment, the compensation factors are merged using register files and state machines, and wherein step a0) further includes: a) sorting the compensation factors in ascending order, while keeping a list of corresponding previous decisions for the sorted compensation factors list; b) assigning a unique index to each element of the sorted compensation factors; c) assigning a corresponding weight factor of 1 to each element of the sorted compensation factors; d) assigning a corresponding valid flag to 1 to each element of the sorted compensation factors; e) computing the differences between the valid sorted compensation factors; f) selecting the indexes of the list corresponding to the smallest difference; g) merging said indexes through a weighted average, using the weight factors corresponding to the compensation factors being merged; h) updating weight factors of the merged cells by increasing their value by one; i) setting to zero the valid flag of the smallest index of the two merged sorted compensation factors; j) setting the value of the element of the unique index list corresponding to the smallest index of the two merged sorted compensation factors to the value of the element of the unique index list corresponding to the largest index of the two merged sorted compensation factors; and k) repeating steps e) through j) until the number of valid compensation factors has reached a desired limit.

In an example embodiment, step a1) further includes: assigning values of a mapping table by assigning an increasing index value for each unique value of the unique index list.

In an embodiment, the present disclosure provides a non-transitory machine readable medium having stored thereon statements and instructions for execution by a processor to perform a method as both generally and specifically described and illustrated herein.

In an embodiment, the present disclosure provides a DFE, including: a plurality (R) of input samplers; a compensation factors reduction module configured to create a reduced set of compensation factors (R) based on an original set of compensation factors ($K^N$) for the unrolled DFE, where $R<K^N$; a mapping and ordering function configured to apply the reduced set of compensation factors as input sampler thresholds for the plurality of input samplers to generate a reduced set of unrolled DFE decisions, the number of input samplers being no more than R; and a mapping function configured to select an appropriate DFE decision from the reduced set of unrolled DFE decisions based upon previous bit values and in accordance with a mapping table.

A brief discussion of general DFE compensation will now be provided. Once optimal compensation characteristics of a DFE are known, the range of this compensation is also known. For each received symbol, the decision output of the DFE is computed by comparing the equalized signal with decision thresholds, as shown in Equation 1.

$$D_i(n) = T_{i,L} < I(n) + C(n) < T_{i,H} \qquad \text{Equation 1}$$

where:

$D_i(n)$ represents the digital decision for symbol type i of UI n.

$T_{i,L}$ represents the low digital decision threshold for symbol type i.

$T_{i,H}$ represents the high digital decision threshold for symbol type i.

$I(n)$ represents the input signal for baud n.

$C(n)$ represents the DFE compensation factor for baud n.

This is equivalent to comparing the input signal with modified decision thresholds, as shown in Equation 2. As mentioned earlier, this is the basic operating principle of unrolled DFEs.

$$D_i(n) = T_{i,L} - C(n) < I(n) < T_{i,H} - C(n) \quad \text{Equation 2}$$

Thus, for each symbol type i, the range of amplitudes of the input that can affect the decision is determined by subtracting the possible compensation range from the thresholds of this symbol type. In this general case, it must also be determined whether the input signal was below the low threshold minus the compensation, between the low and high thresholds minus the compensation, or above the high threshold minus the compensation. However, this processing can be split into three operations. In this case, the input signal is first compared with a first threshold minus compensation. Then it is compared with a second threshold minus compensation. Finally, the results from the above decisions are combined together to generate signal $D_i(n)$.

So, without lack of generality, the decision equation can be expressed as in Equation 3.

$$C(n) = B(D(n-1), D(n-2), \ldots, D(n-N))$$

$$\hat{D}_{i,k}(n) = I(n) > T_{i,k} - C(n)$$

$$D_i(n) = F(\hat{D}_{i,k}(n) \forall k)$$

$$D(n) = G(D_i(n) \forall i) \quad \text{Equation 3}$$

where:

B represents a function that computes the compensation factor at baud n from the decision taken at previous bauds $\hat{D}_{i,k}(n)$ represent the partial decision k for symbol type i and baud n $T_{i,k}$ represents the partial threshold k for symbol type i (e.g. $T_{i,L}$ and $T_{i,H}$)

F represents a digital function that combines the partial decisions into a decision for symbol type i.

G represents a digital function that combines the decisions for every symbol type into a final decision Usually, $T_{i,1}$ is equal to $T_{i+1,0}$, which means that the high threshold for symbol type i is equal to the low threshold for symbol type i+1 (i.e., $T_{H,i} = T_{L,i+1}$). i has a range equal to the number of symbol types minus one, since there is no low threshold. Furthermore, there is usually no need for a low threshold for the first symbol type, and no need for a high threshold for the last symbol type.

Unrolled DFEs compute all possible combinations of decision threshold values based upon the complete set of compensation factors, as described in Equation 4.

$$\tilde{T}_{i,k,x} = T_{i,k} - C_x$$

$$\tilde{D}_{i,k,x}(n) = I(n) > \tilde{T}_{i,k,x}$$

$$D_{i,x}(n) = F(\tilde{D}_{i,k,x} \forall k)$$

$$D(n) = \tilde{G}(D_{i,x}(n) \forall i, x:d(n-1), D(n-2), \ldots) \quad \text{Equation 4}$$

where:

$C_x$ represents a possible compensation factor, or value of a compensation factor, i.e. one of the possible results of B. Index x spans all possible combinations of previous decisions.

$\tilde{T}_{i,k,x}$ represents compensated threshold levels for partial decision k for symbol type i and DFE compensation factor x $\tilde{D}_{i,k,x}(n)$ represents the partial decision k for symbol type i and DFE compensation factor x, for baud n F represents a digital function that combines the partial decisions into a decision for symbol type i.

$\tilde{G}$ represents a digital function that combines the decisions for every symbol type into a final decision, based upon previous N decisions This is only a particular example, and as those skilled in the art will recognize that functions F and G can be combined or can interchange the order in which indexes i, k and x are resolved.

To further explain aspects of the present disclosure, consider the simple case where two symbol types are present (e.g. NRZ coding). In this case, the above equations can be simplified with only one threshold (i) and one partial decision (k). For a DFE considering N previous decisions to compute the compensation for the current decision, this leads to $2^N$ possible compensation factors, thus x has range from 0 to $2^{N-1}$. Function F becomes a trivial identity function, while function G selects which of decisions $D_x$ is the correct one, based upon the previous decision history; it selects which index x corresponds to the previous history, and outputs the corresponding $D_x$ as the current baud's decision.

FIG. 1 illustrates an embodiment of such a known unrolled DFE. A DFE compensation factors calculation module 100 is used by a thresholds calculation module 102 to calculate the desired thresholds that are used for the $2^N$ samplers 104. The sampler outputs are provided to a multiplexer 106, as are the N previous decisions gathered by delay blocks 108. Details regarding the calculation of DFE compensation factors are known to those of ordinary skill in the art and will not be discussed herein.

Figure 2:
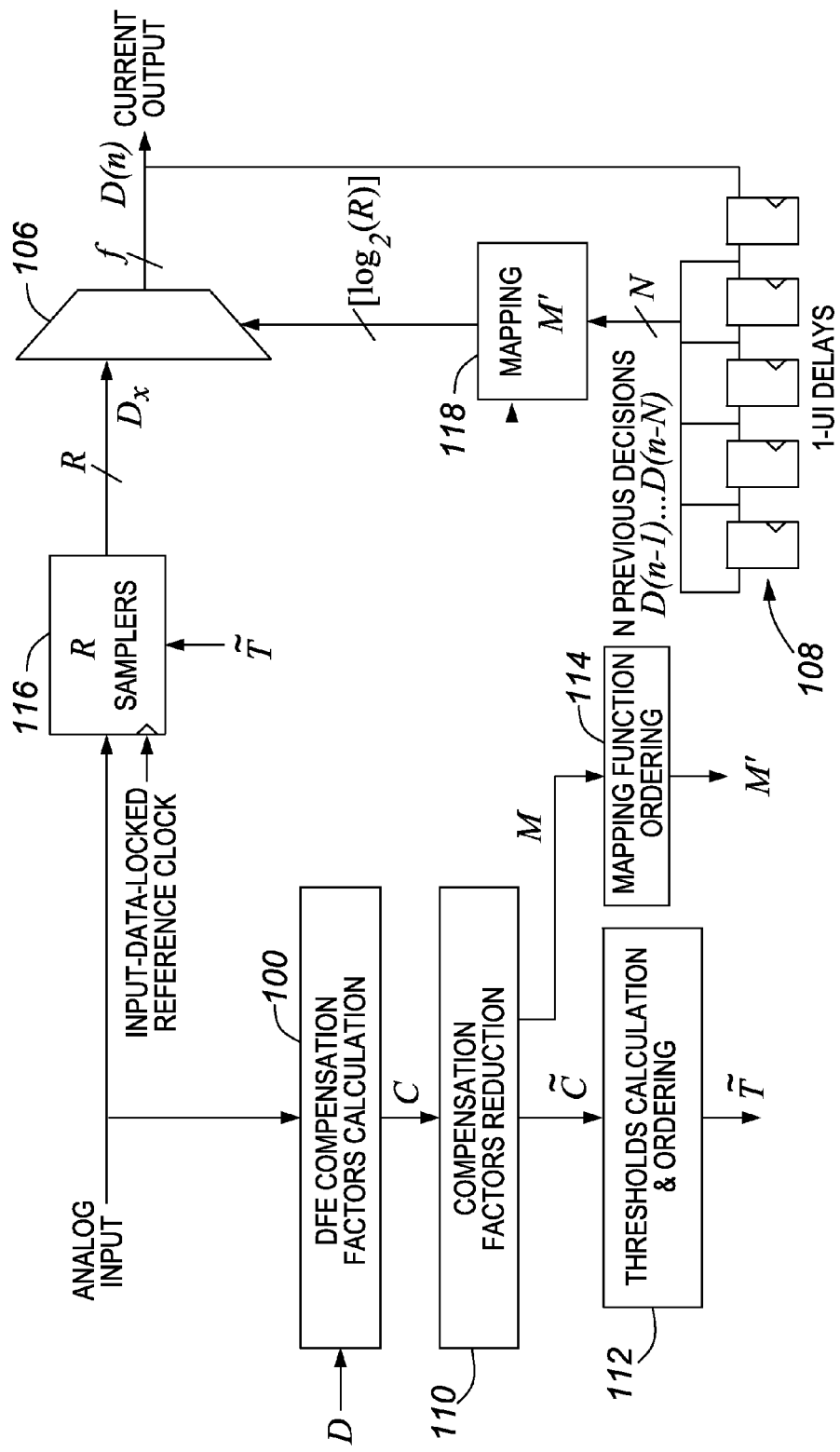
FIG. 2 illustrates an unrolled DFE according to an embodiment of the present disclosure.

FIG. 2 illustrates an unrolled DFE according to an embodiment of the present disclosure. Embodiments of the present disclosure provide means to reduce the number of compensation factors while keeping the same number of previous decisions to select the compensation factor to apply.

In FIG. 2, following the DFE compensation factors calculation module 100, the compensation factors are reduced by a compensation factors reduction module 110, the operation of which will be described further below. The reduced number of compensation factors is used as an input for thresholds calculation and ordering 112 and for mapping function ordering 114. A reduced number of R samplers 116 is provided with the thresholds calculated by the thresholds calculation and ordering module 112. A mapping function 118 maps the N previous decisions to the reduced index of previous decisions that are provided as an input to the multiplexer 106.

Equation 4 shows that the unrolled decision threshold levels ($\tilde{T}_{i,k,x}$) are closely related to the compensation factors ($C_x$). Any reduction in the number of compensation factors directly leads to an equal reduction in the number of decision threshold levels required by the unrolled DFE architecture. Since each decision threshold corresponds to one input data sampler in this architecture, any reduction in the number of compensation factors will also result in an equal reduction of the number of input samplers. This reduction brings many advantages: reduction in circuit power, area, design verification, etc. Furthermore, as can be seen from Equation 4, any such reduction will also lead to simpler functions F and G.

Embodiments of the present disclosure provide a benefit, or result, of a reduced number of samplers, R, associated with a reduced number of combination of decision thresholds, $\tilde{T}$. This implies that the appropriate decision is selected based upon a number of previous bauds, N, that can represent a larger number of combinations, $K^N$, than the reduced number of samplers R. The reduced set of thresholds is derived from the full $K^N$ set of compensation factors by means of a method that minimizes the degradation of the performance of the final system.

While the resulting system as shown in FIG. 2 does not have the same performance as if the full $K^N$ set of samplers was used, embodiments of the present disclosure nevertheless attain very similar performance while reducing the power and complexity of the design. This is because in practical systems, the DFE compensation factors have a progression that is not linear. This means that the differences between consecutive ordered compensation factors are not constant. Thus reducing the number of compensation factors, as explained in this disclosure, leads to a performance degradation that is smaller than that of reducing the number of previous bauds used in the selection of the compensation level of the prior art, for a constant number of input samplers.

Figure 3:
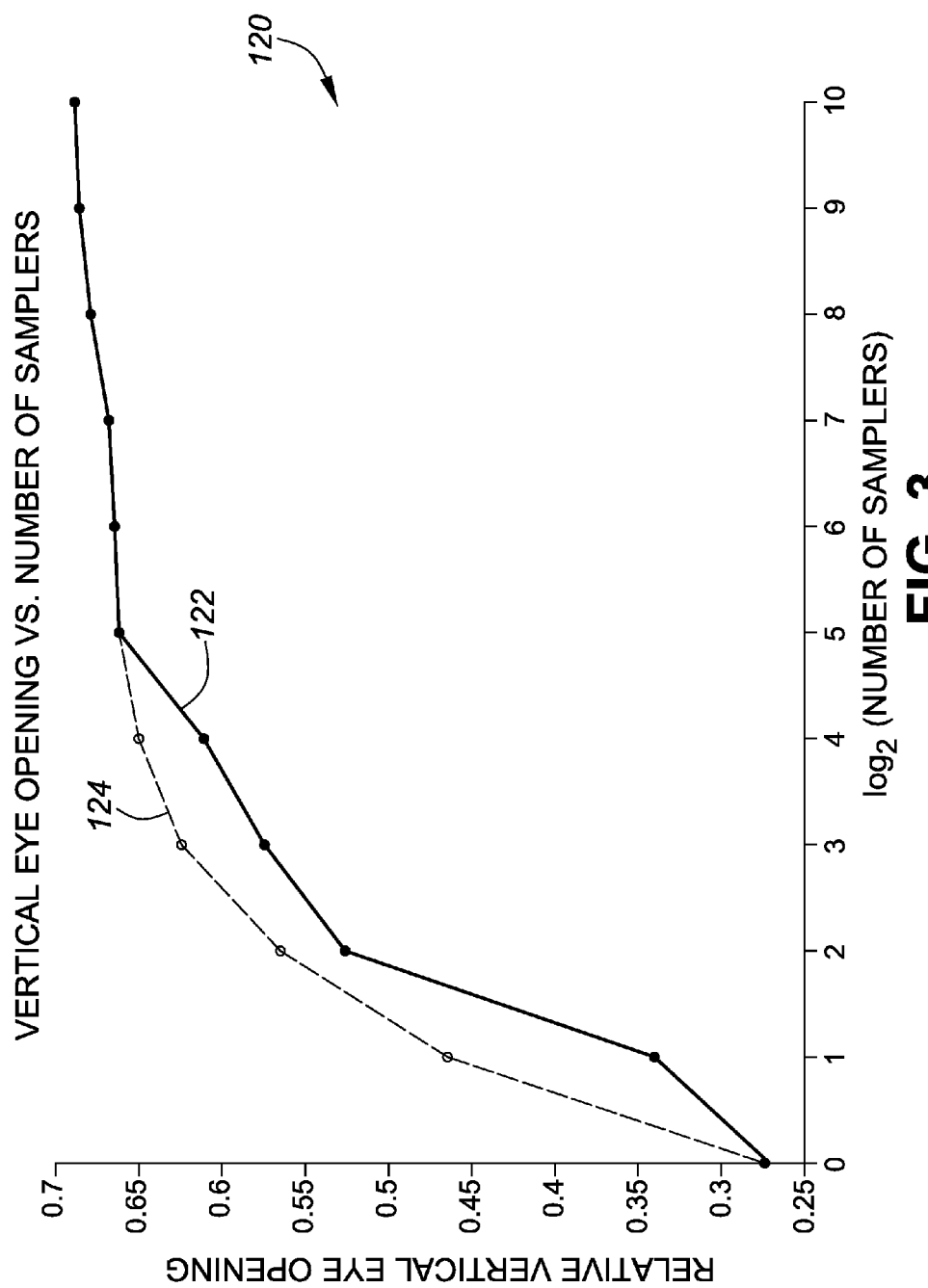
FIG. 3 is a graph illustrating example performance of a known unrolled DFE and an unrolled DFE according to an embodiment of the present disclosure.

FIG. 3 illustrates example performance of both a known approach and an approach according to an embodiment of the present disclosure. In FIG. 3, the x axis represents $\log_2$ of the number of samplers, which corresponds to the DFE depth for the unrolled DFEs of the prior art. The solid line curve 122 represents the vertical eye opening after applying a DFE system with the specified DFE depth.

The dashed line curve 124 represents the performance of a 5-tap DFE with reduced number of samplers according to the present disclosure. The dashed line curve 124 is thus only defined up to $2^5=32$ samplers, and then fits exactly with the prior art solid line curve 122, as there is no compensation factor compression at this point. When the number of samplers is reduced, the vertical eye opening also goes down, but not as fast as if the DFE depth had been reduced while using its associated full set of $2^N$ samplers. For example, eye opening using $2^4=16$ samplers is down from 0.67 UI to about 0.61 UI when going from a 5-taps to a 4-taps DFE (solid line curve 122, at x=5 and x=4). However, it is down only to about 0.65 UI when considering a 5-taps DFE using 16 samplers according to the present disclosure (dashed line curve 124).

The amount of improvement vs. a nominal unrolled DFE with the same number of samplers depends upon the response of the channel to equalize and the chosen depth of the DFE. This advantage is expected on most practical channels. This is because to produce a linear spacing of the compensation factors, an exponential scaling is required between the DFE coefficients' amplitude. Practical channels with that kind of shape would usually be rather easy to equalize, as their compensation factors (tap values) would decay rapidly (exponentially). Furthermore, there is only one set of DFE compensation factor amplitudes that leads to a linear distribution of the levels. Any other set of compensation factor amplitudes will lead to smaller distances between some adjacent compensation factors, thus smaller error if they are merged together. This disclosure takes advantage of this particularity to selectively remove levels so as to minimize performance degradation.

An example embodiment of the present disclosure involves first setting a target number of compensation factors, R, which will represent the final range of x'. Then, the original set of compensation factors, or possible compensation factors, $C_x$, is sorted into list $\tilde{C}_{\tilde{x}}$, and the mapping between the original indexes x and the sorted indexes $\tilde{x}$ is preserved. This can be performed using digital registers or memory elements, as illustrated in FIG. 4.

Figure 4:
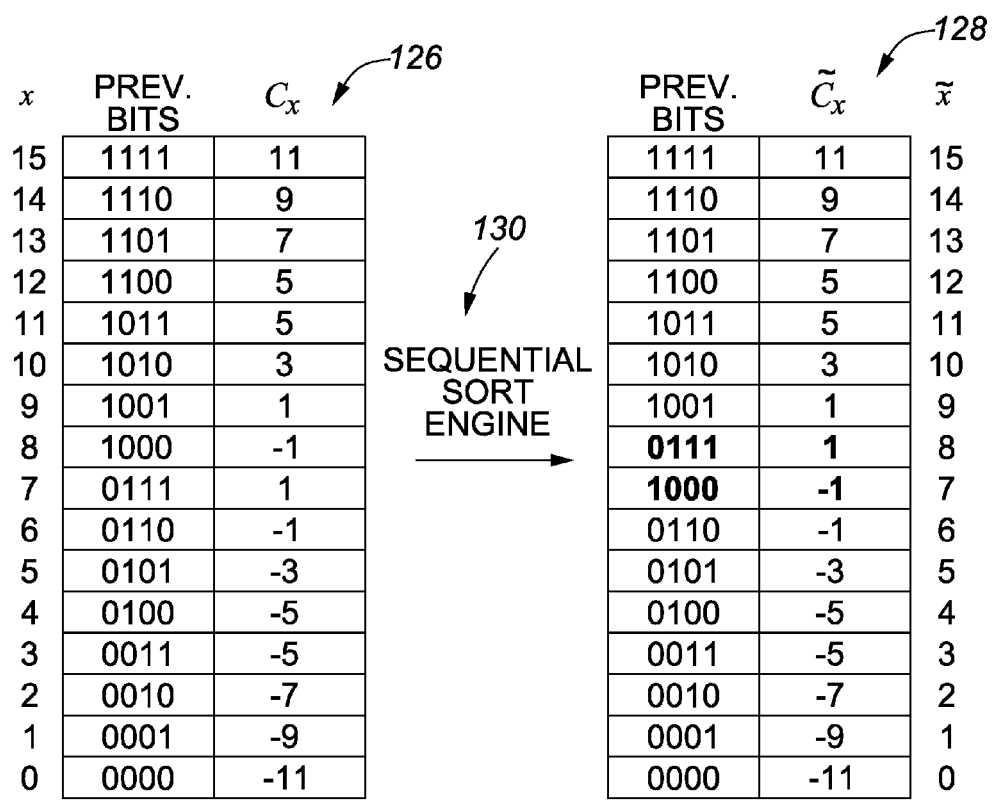
FIG. 4 illustrates sorting compensation factors and preserving original order mapping according to an embodiment of the present disclosure.

FIG. 4 shows sorting compensation factors and preserving original order mapping. In FIG. 4, instead of ordering the previous bits by the bit values as in table 126, the previous bits are ordered by their corresponding compensation factor value as in table 128. In an embodiment, the sorting and ordering is performed by a sequential sort engine 130. In the process of sorting by compensation factor value, the original mapping is preserved.

It often happens that the compensation factors are symmetrical around a center value, usually zero. When that is the case, the sorted list of compensation factors can be reduced to half its length, as illustrated in FIG. 5.

Figure 5:
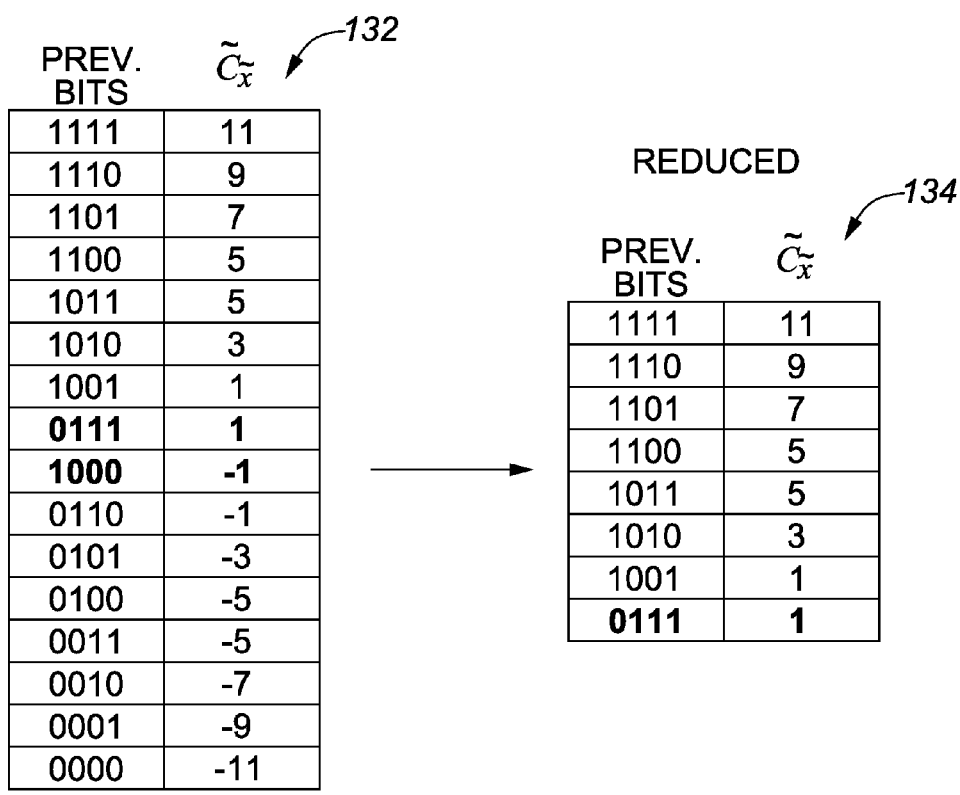
FIG. 5 illustrates building a symmetrical list of compensation factors according to an embodiment of the present disclosure.

FIG. 5 shows an embodiment of building a symmetrical list of compensation factors 132. This takes advantage of properties of symmetry for the purposes of reducing computation, and results in a reduced list of values 134. In this embodiment, the full library of compensation factors will be recovered after the compression of this list, by expanding it back using the original symmetry properties.

A symmetrical compensation factors list can also be created from a non-symmetrical compensation factors list by averaging the magnitude of the indexes expected to be symmetrical, and retaining the original sign and offset. For example, if list indexes +i and −i are expected to be symmetrical around offset o, symmetrical compensation factor is computed by Equation 5.

In many cases, offset o is zero, so Equation 5 can be further simplified.

$$Cs_{+i} = \frac{(C_{+i} - o) - (C_{-i} - o)}{2} + o = \frac{C_{+i} - C_{-i}}{2} + o \qquad \text{Equation 5}$$

Figures 6A, 6B:
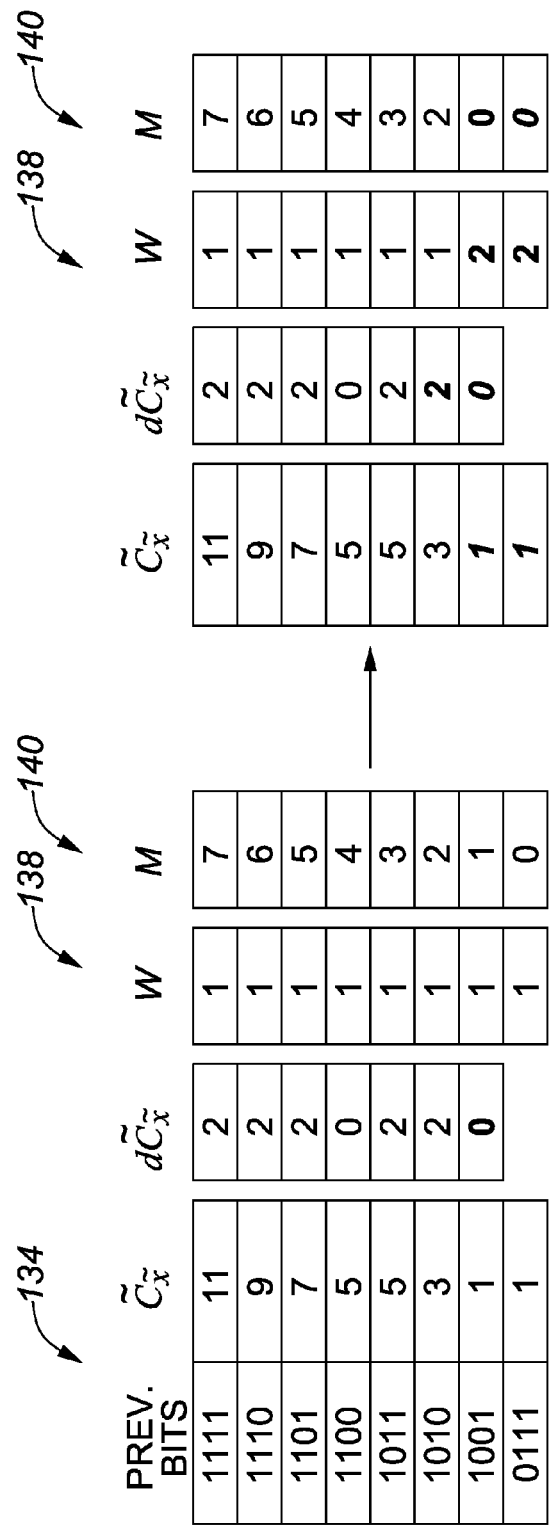
FIGS. 6A and 6B illustrate a first step of merging process according to an embodiment of the present disclosure.

FIGS. 6A and 6B illustrate a first step of the compensation factor merging process according to an embodiment of the present disclosure. The sorted list of compensation factors 132, which in the example of FIG. 6A is a sorted reduced list 134 using symmetry properties, is differentiated using a function or values ($d\tilde{C}_{\tilde{x}}$). In an embodiment, the levels within which there is the smallest difference are merged together into a new level that represents the average of the two adjacent levels. For example, if levels $\tilde{C}_0$ and $\tilde{C}_1$ have the smallest difference, level $\tilde{C}_0$ is replaced by $$\frac{\tilde{C}_0 + \tilde{C}_1}{2},$$

and level $\tilde{C}_1$ is eliminated from the list.

A weight vector 138, W, is formed that holds the number of levels that were averaged for a given final level. Another vector 140, M, is formed that holds the mappings from the original input combination to the final levels. Such vectors can be embodied as registers, as shown in FIG. 6.

Initially in FIG. 6A, vector W 138 contains a value of one for each element of $\tilde{C}_{\tilde{x}}$. The values of vector W are updated in FIG. 6B after levels are merged. For example, if levels 0 and 1 are merged as above, then $W_0$ is increased in FIG. 6B by 1 to a value of 2. The values of vector M are initialized with the indexes of $\tilde{x}$ that they represent. The values of vector M are also updated in FIG. 6B after the levels are merged, with $M_1$ set to zero to indicate this compensation level will now refer to compensation level 0.

This process is repeated until the number of levels has been reduced to the desired target number, R, or R/2 if the list was reduced through symmetry. In an embodiment, the differences are only computed for the valid list of elements, i.e. those that have not been eliminated in the reduction process. Furthermore, in an embodiment, the averaging process takes into account the previous number of averages that were performed. The equations for merging levels n and m thus becomes, in general:

$$\tilde{C}'_n = \frac{\tilde{C}_n \cdot W_n + \tilde{C}_m \cdot W_m}{W_n + W_m} \quad \text{Equation 6}$$

$$W_n = W_n + W_m$$

$$M_m = n$$

There is no need to sort the list of levels after merging levels together, as the result would stay the same.

In an embodiment, whenever two sets of levels have the same difference, one of these sets is chosen. In an example embodiment, the selection criteria are as follows, in order of precedence.

1. The set of levels having been through the smallest number of averaging steps, i.e. the set with the smallest $W_n+W_m$.

2. The set of levels that would yield the largest absolute compensation level $\tilde{C}'_n$.

If the number of levels was compressed through symmetry, the full library of symmetrical levels, and their associated mappings, is generated from the final vectors $\tilde{C}_{\tilde{x}}$ and M. In an example embodiment, a new vector, M', is formed with consecutive indexes from 0 to R-1, assigned in consecutive order, changing by one every time vector M changes.

Figure 7:
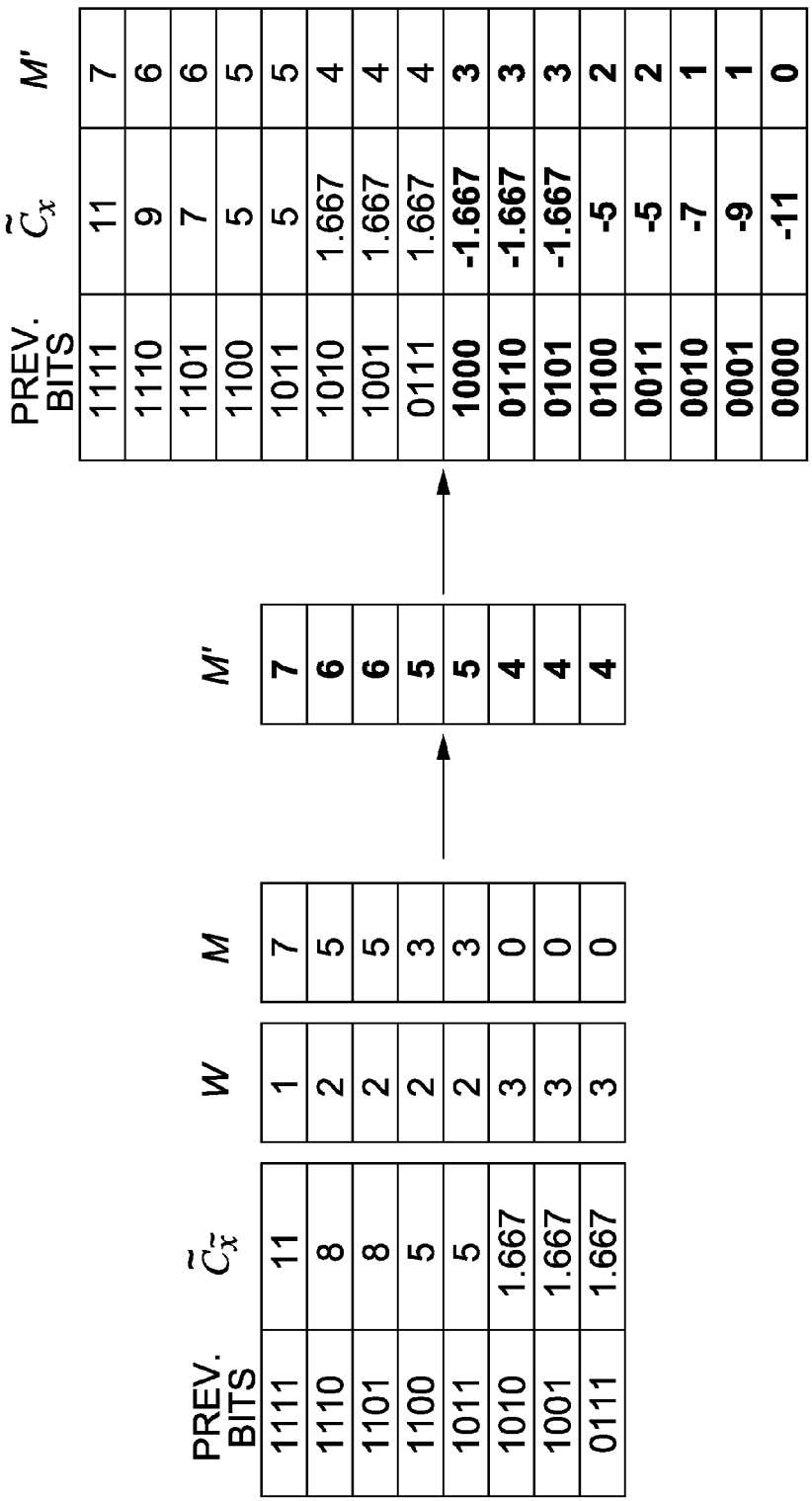
FIG. 7 illustrates level expansion and consecutive reference assignment according to an embodiment of the present disclosure.

FIG. 7 illustrates such a process, through the use of registers. In this case, the desired number of levels was eight (R=8). FIG. 7 illustrates level expansion and consecutive reference assignment according to an embodiment of the present disclosure.

FIG. 8 illustrates a reduced list 150 of thresholds and their indexes according to an embodiment of the present disclosure. The levels of $\tilde{C}_{\tilde{x}}$ that are unique are extracted in the new list of thresholds, $\tilde{T}$, as illustrated in FIG. 8, which shows a reduced list of thresholds and their indices according to an embodiment of the present disclosure. These thresholds are computed according to Equation 4, assuming here that the bit type detection threshold after compensation, T, is zero, which is often the case, for example for AC-coupled inputs and balanced input sequences. For this particular case, $\tilde{T}=T-\tilde{C}=-\tilde{C}$. The length of vector $\tilde{T}$ is R elements.

An unrolled DFE according to an embodiment of the present disclosure can now be implemented with only R samplers, as there are only R different values for vector $\tilde{C}_{\tilde{x}}$, and each of them requires one sampler. In an embodiment, the structure of the DFE is modified such that a mapping function is inserted between the previous decisions and the selection of the current decision, as illustrated in FIG. 2. This mapping function is formed by converting the previous bit combination into the corresponding index of vector $\tilde{T}$; this mapping corresponds to vector M' 152 as illustrated in FIG. 9.

Figure 9:
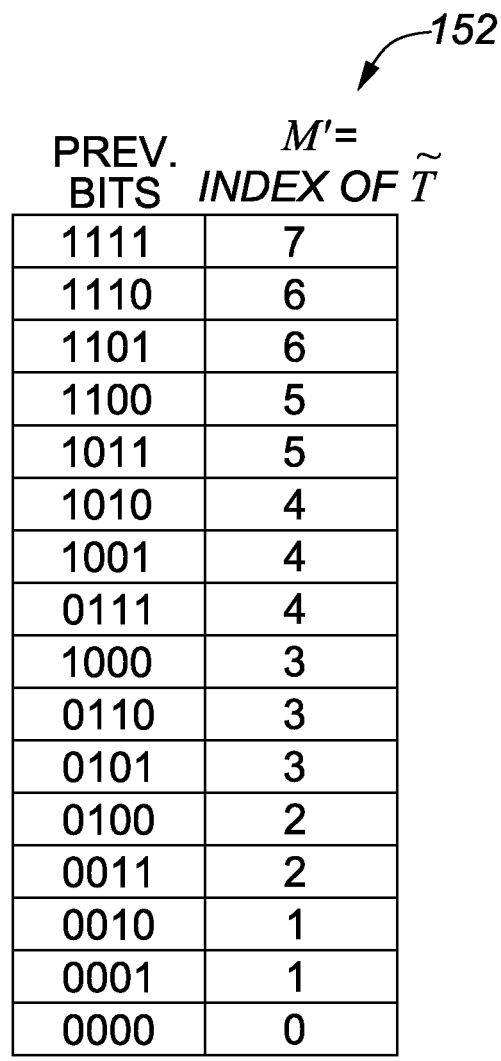
FIG. 9 illustrates a mapping function between previous bits and indexes of decision thresholds according to an embodiment of the present disclosure.

FIG. 9 illustrates a mapping function between previous bits and indexes of decision thresholds according to an embodiment of the present disclosure. The mapping from the original indexes of $C_x$ (i.e. x) into the indexes of the sorted list of compensation factors, $\tilde{x}$, can be used to map the previous bits into the corresponding index of M'. Those skilled in the art will recognize that many possible embodiments can be used to map the previous bits into the selection of the reduced set of thresholds, and their associated decisions from the input samplers.

Figure 10:
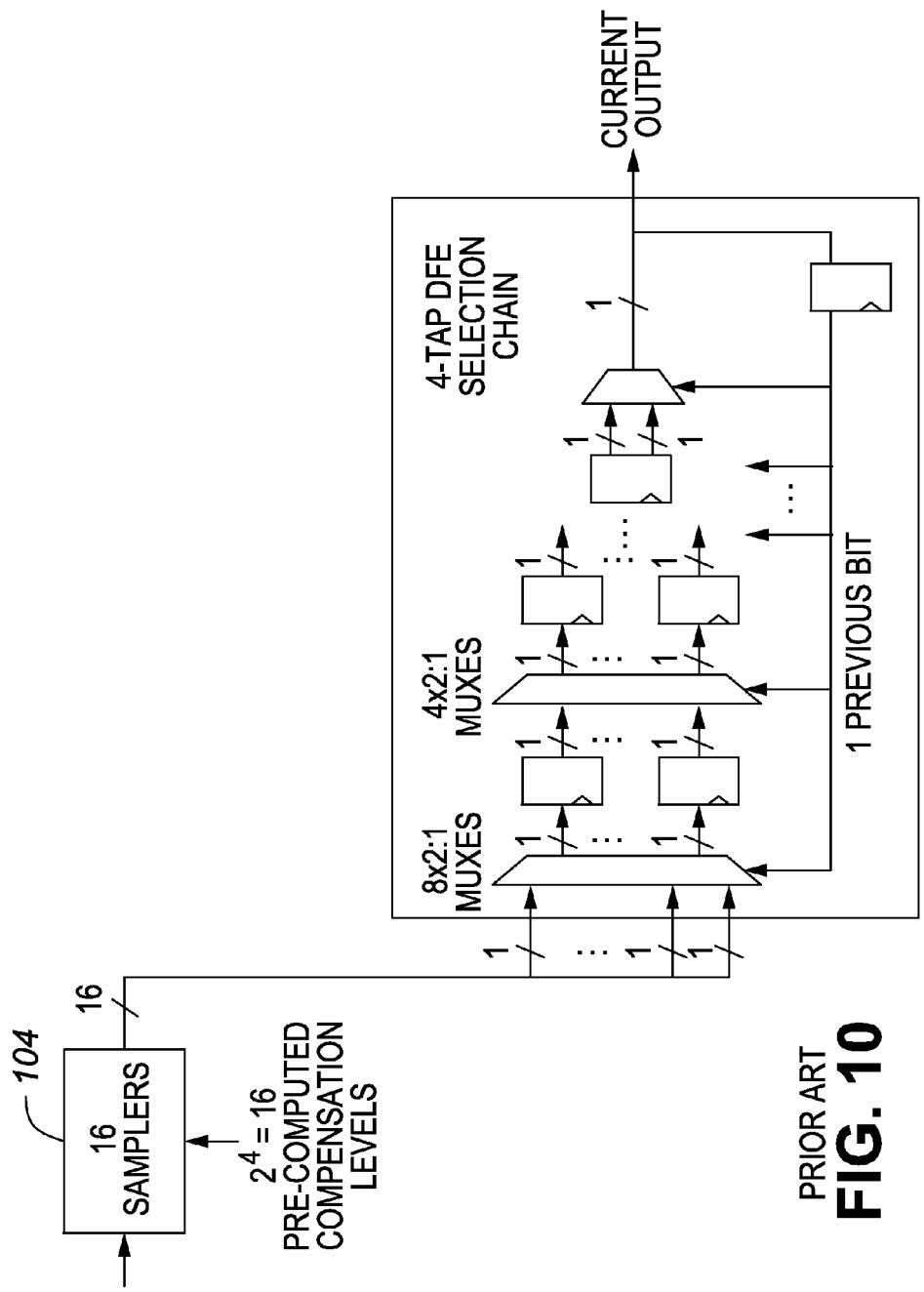
FIG. 10 illustrates a known approach with pipelined DFE tree.

Another example of a prior art embodiment of an unrolled DFE with a pipelined DFE tree is shown in FIG. 10. This shows only one of many possible DFE selection chains, as many implementations exist for this timing-critical part of the system. For a 4-tap unrolled DFE, 16 samplers are required. The DFE selection chain then selects the right decision from these 16 samplers.

Figure 11:
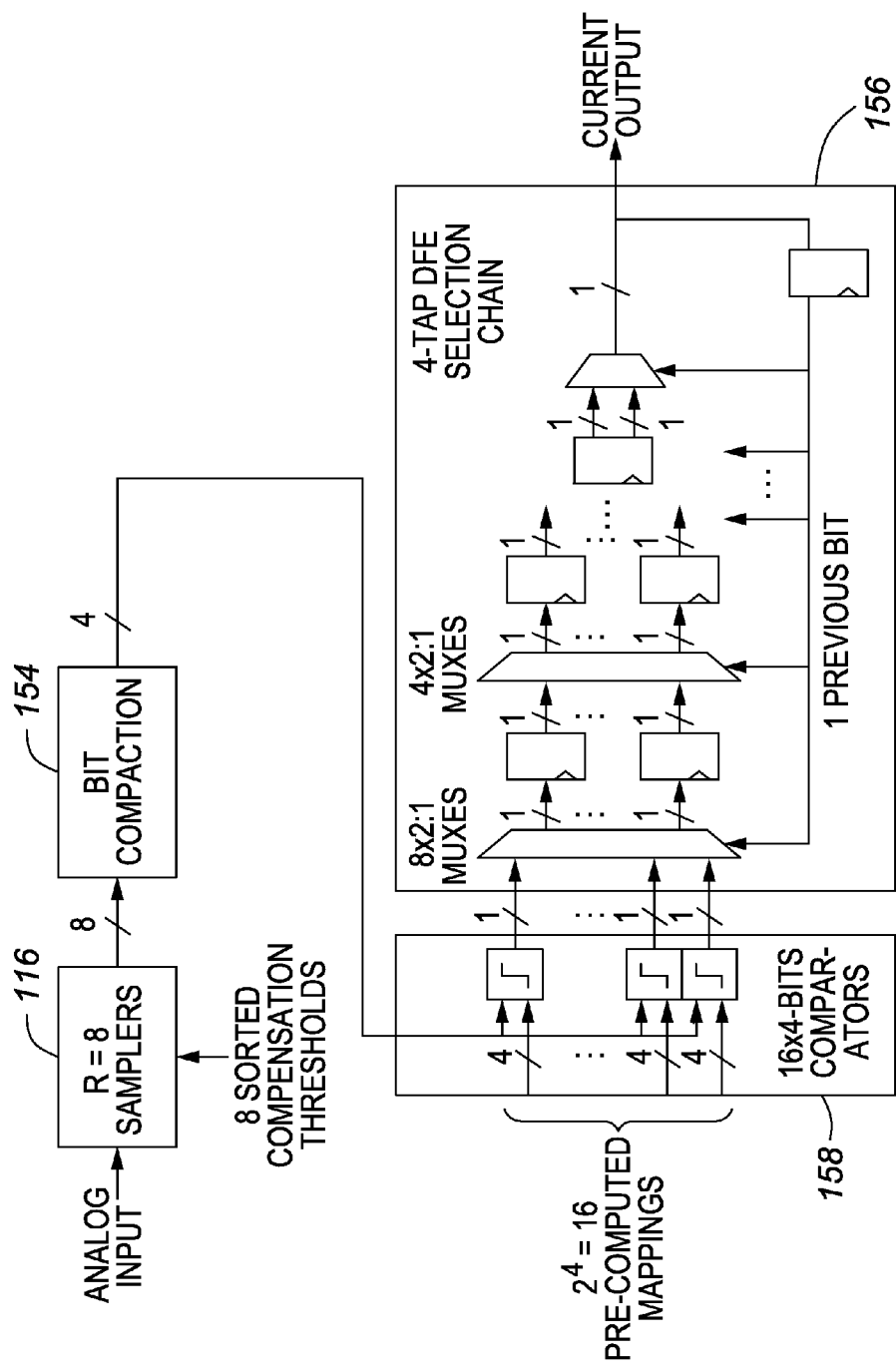
FIG. 11 illustrates a pipelined DFE selection chain according to an embodiment of the present disclosure.

FIG. 11 illustrates an embodiment of the present disclosure using the same pipelined DFE selection chain. The sorted compensation thresholds are directly obtained from $\tilde{C}_{\tilde{x}}$, here for R=8. Since levels are sorted, the output code from the samplers is expected to be a "marching-one" code, i.e. there is only one transition in the code, with all bits below this transition having a value of 1. Thus, there are really only 9 possible output codes, i.e. [00000000], [10000000], [11000000], ..., [11111110], [11111111]. These codes can be mapped to 4 bits by a bit compaction block 154. Note also that unsorted compensation thresholds would have resulted in still only 9 possible combinations, but with a different bit order. An appropriate bit compaction block 154 could have been used to still generate the same 4-bit code from these unsorted sampler's outputs. Further error correction can be integrated in this bit compaction block 154, for example to remove invalid codes due to sampler's offsets.

The 4-bit code is then compared to a set of $2^N$ pre-computed mapping indexes, to generate $2^N$ decisions, i.e. one for every combination of the previous N decisions. In this example, N=4, which means that 16 such mapping indexes are computed. These indexes are computed by sorting vector M' per the previous decisions' combination that corresponds to each of its values.

A DFE decision tree block 156 in the example embodiment of FIG. 11 is a combination of the multiplexer 106 and the delay blocks 108 of FIGS. 1 and 2, with the multiplexer stages pipelined between the delay elements. The $2^4$ pre-computed mappings that are the input to a comparator mapping block 158 in FIG. 11 map the comparator index, corresponding to the combination of previous bits, into the index of the sampler whose output is to be used for the next bit. Examples of such mappings are shown in FIG. 12 using reference numeral 162, as referred to below.

Figure 12:
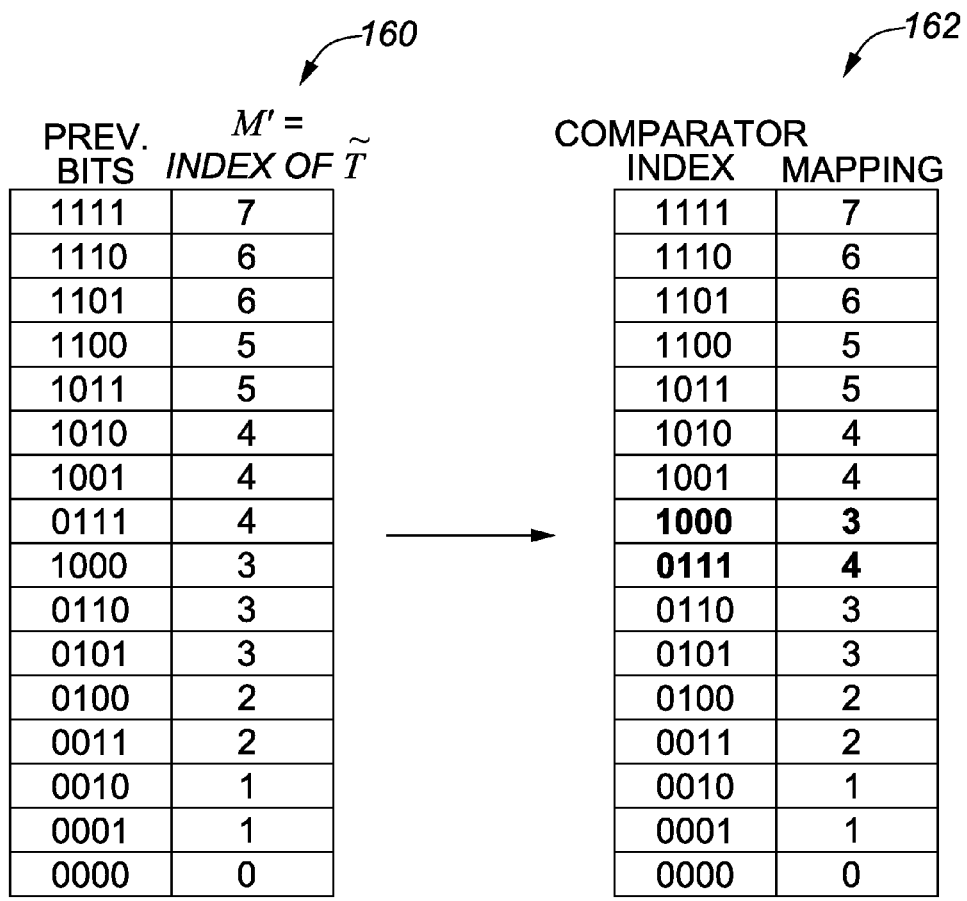
FIG. 12 illustrates a comparator's Mapping Indexes Calculation according to an embodiment of the present disclosure.

For example, if vector M' and the previous decisions are such as shown in FIG. 9, then the comparison values for each comparator will be such as shown in FIG. 12. The embodiment of FIG. 12 illustrates a comparator's mapping indexes calculation. In this embodiment, and with reference to elements in FIG. 11, a comparator from the comparator mapping block 158 will output a digital one if the 4-bit code it receives from the bit compaction block 154 is larger than its mapping index input, received from the pre-computed mappings inputs. That is, a code of 1 coming from the bit compaction block 154 is required to generate a 1 from a comparator receiving a mapping index equal to 0. FIG. 12 shows the conversion from a table 160 of previous bits and associated indices, to a table 162 of comparator index and associated mapping values.

Those skilled in the art will appreciate that this mapping can be performed in a number of ways different than the aforementioned bit compaction and digital comparison to ordered indexes. For example, the output from the samplers can be sent to a switch matrix that steers the appropriate selection to the appropriate input of the DFE selection chain. Each sampler's output can then feed many DFE selection chain inputs, so as to feed all $2^N$ inputs with only R signals. This and other variants are really just digital equivalent to the diagram of FIG. 2.

While the embodiments disclosed so far present an efficient and practical method to reduce the number of samplers while maintaining an acceptable performance level for a particular application, other underlying methods can also be used. In particular, Lloyd has disclosed a procedure to determine the optimal grouping of elements to reduce a cost function related to the distance between each element and its associated group's centroid in S. P. Lloyd, Least Squares Quantization in PCM", IEEE trans on Info Theory, pp. 129-136, March 1982, which is incorporated herein by reference. A similar and slightly more general procedure was also disclosed by Max, in J. Max, "Quantizing for Minimum Distortion, IRE Trans Info Theory, pp 7-12, March 1960, which is also incorporated herein by reference.

Such approaches and methods can be used to minimize the number of DFE compensation factors, by creating groups of DFE compensation thresholds and associated centroids. The centroids are used as the reduced set of threshold levels, while the group index to which the original DFE compensation thresholds belong are used to map which samplers' output is to be selected for each combination of the previous history. The process is thus similar to choosing the best quantization of the DFE compensation thresholds themselves, rather than the quantization levels for the input signal. Embodiments using this method require more processing than the embodiments described earlier. A digital processor can then be used to compute the partitions and centroids using these techniques. This still corresponds to the general embodiment of FIG. 2, only that in an example embodiment the Compensation Factors Reduction step requires a processor.

These procedures can also take into account non-uniform usage of the compensation factors. If, from a-priori knowledge of the encoding scheme, or through empirical measurements using the input signal, the probability to use each compensation factor is known, this information can be used to steer the selection of the best partition. Furthermore, Max' algorithm allows selecting an arbitrary cost function.

Time Domain DFE

DFE structures have often been used to correct input amplitudes. However, they can also be used to correct other types of impairments. An example is disclosed in U.S. patent application Ser. No. 12,969,402, entitled Reduction of Correlated Channel Impairments, which is incorporated herein by reference, where a DFE structure is used to correct for the optimal location of the center of the eye. This is effectively a DFE over the timing axis, which corresponds to FIG. 13, illustrating a known time-domain DFE.

Figure 13:
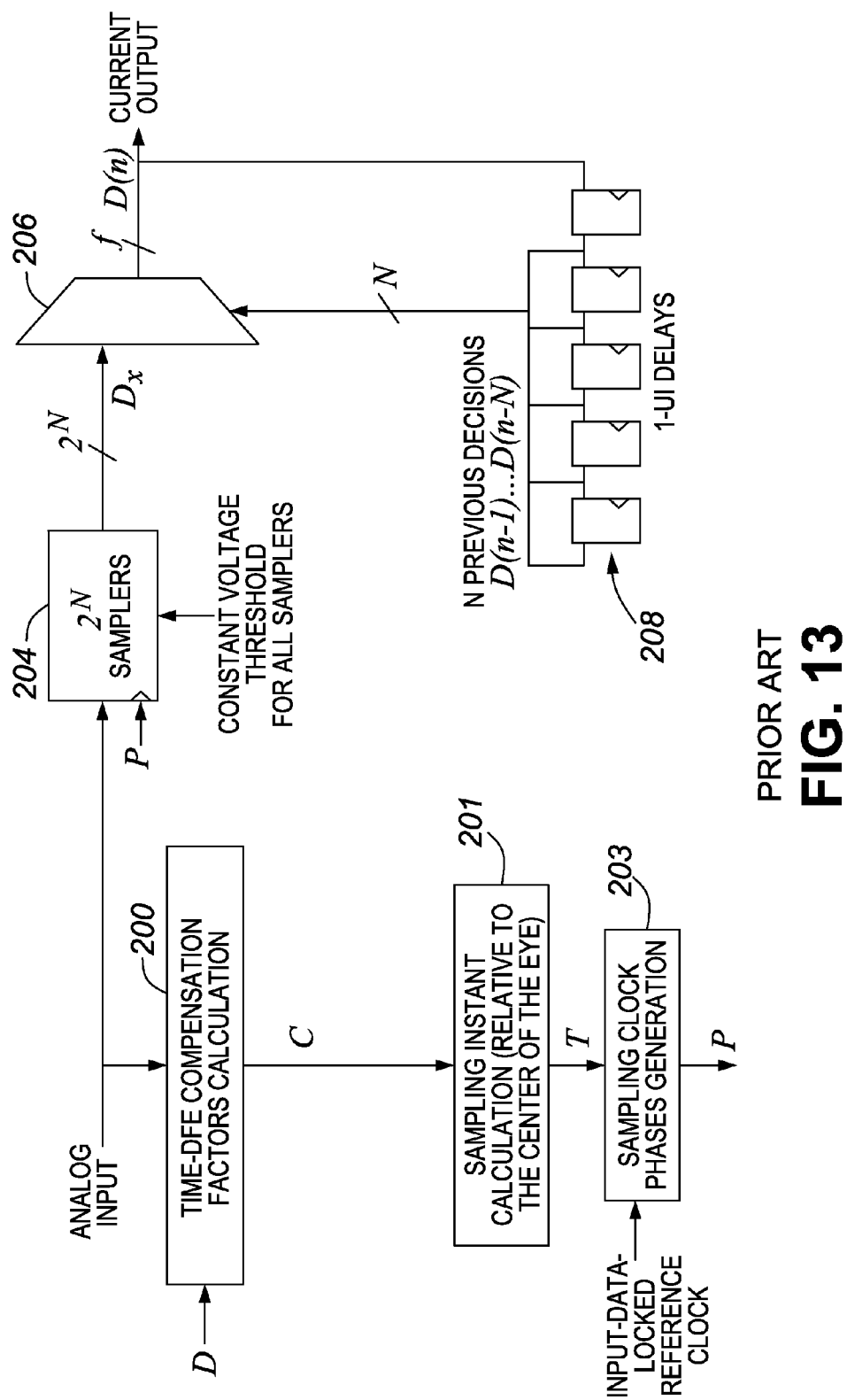
FIG. 13 illustrates a known Time-Domain DFE.
Figure 14:
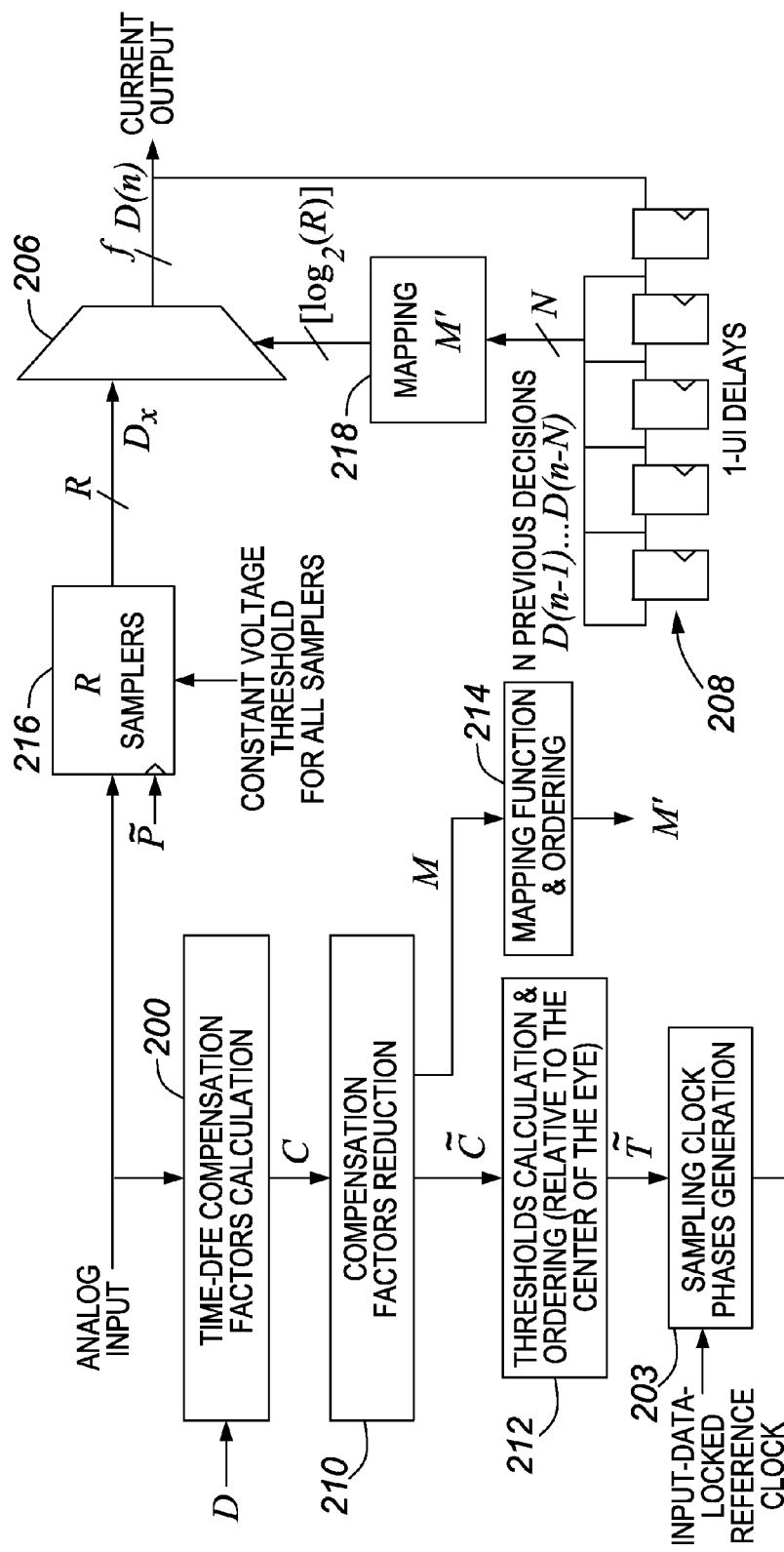
FIG. 14 illustrates a time-domain DFE according to an embodiment of the present disclosure.

The one-bit-per-baud time-domain DFE of FIG. 13 presents many similarities with the voltage-domain DFE of FIG. 1. This is represented by using similar reference numerals to represent the time DFE compensation factors calculation 200, $2^N$ samplers 204, multiplexer 206 and delay blocks 208. As is known and understood by one of ordinary skill in the art, the calculation involved for the compensation factors calculation block 200 as shown in FIGS. 13 and 14 differs from the related calculation for the voltage-domain DFE. The same general structure applies, but the DFE compensation applies to the sampling instants, as shown in sampling instant calculation 201, while the sampling thresholds are kept constant. Thus the DFE controls the phase of the clocks (P) sent to each sampler, such as using sampling clock phase generation block 203. These different clocks are generated by adding the phase shift, represented by T, to the reference input-data-locked clock. There is one specific clock for each sampler.

FIG. 14 illustrates a time-domain DFE according to an embodiment of the present disclosure. For the most part, similar/parallel blocks as for the Voltage-Domain DFE of FIG. 2 are found in the diagram of FIG. 14, with corresponding reference numerals. For example, there is thresholds calculation and ordering 212, mapping function ordering 214, there are R samplers 216 and a mapping function M' 218.

The number of sampling phases generated is reduced from signal set P to signal set $\tilde{P}$, the latter comprising only R elements.

Embodiments of the present disclosure are particularly interesting for such a time-domain DFE, as in the embodiment described in FIG. 14, where each sampling phase requires a specific clock. The generation of each clock requires a significant amount of hardware. By reducing the number of compensation levels as described in this disclosure, significant power, area and complexity savings can be achieved.

Figure 15:
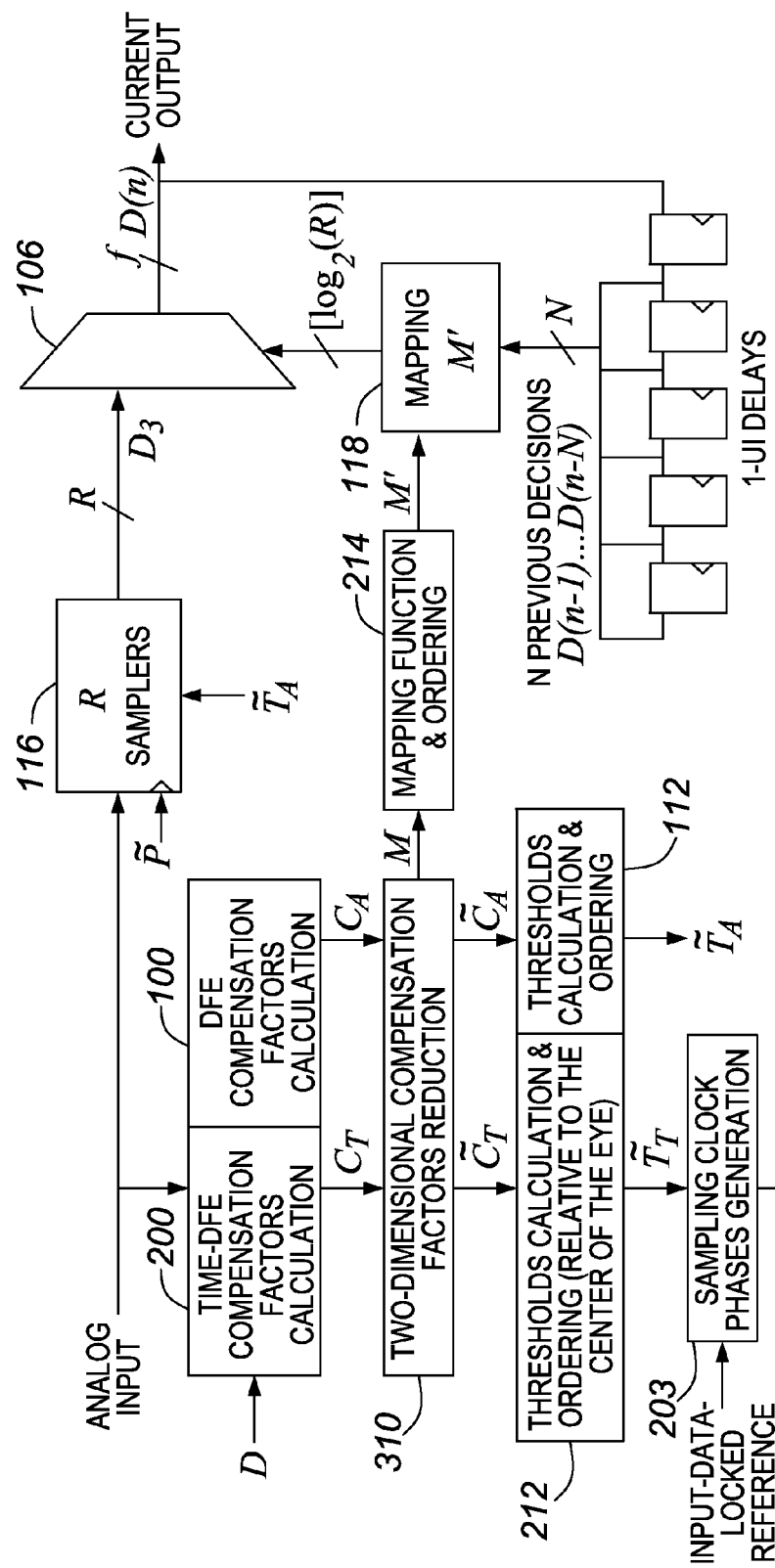
FIG. 15 illustrates a combined time and data-domain DFE according to an embodiment of the present disclosure.

FIG. 15 illustrates a combined time and data-domain DFE according to an embodiment of the present disclosure. This embodiment enables compensation of both the timing instant and the voltage thresholds. The embodiment of FIG. 15 leads to a junction of the above described methods, which illustrates a combined time and data-domain DFE using similar reference numerals as in FIGS. 2 and 14. The two-dimensional compensation factors reduction 310 represents the combination of the compensation factors reduction 110 from FIG. 2 and the compensation factors reduction 210 from FIG. 14.

One advantage of the embodiment of FIG. 15 is that now the compensation factors can be applied in two orthogonal dimensions. Methods such as those disclosed by Lloyd can be used to simultaneously reduce the number of time and voltage compensation factors in an optimal way, provided a conversion factor to convert a quantization error from one domain into the other. Merging two compensation factors yields errors both in the time domain, measured in seconds, and in the amplitude domain, measured in volts. A combined error function is derived from these two orthogonal errors to guide the reduction process. For example, the error in the time domain can be divided by the bit period ($T_{bit}$), and the error in the voltage domain can be divided by the average input signal amplitude (A), or the main cursor. Finally, the combined error can be represented by a weighted sum of the square of these two ratios, such as in Equation 7.

$$\epsilon_{Ar} = \epsilon_A / A$$
$$\epsilon_{Tr} = \epsilon_T / T_{bit}$$
$$\epsilon = \epsilon_{Tr}^2 + k\epsilon_{Ar}^2 \qquad \text{Equation 7}$$

where $\epsilon_T$ and $\epsilon_A$ represent the errors in the time and amplitude dimensions, respectively.

Figure 16:
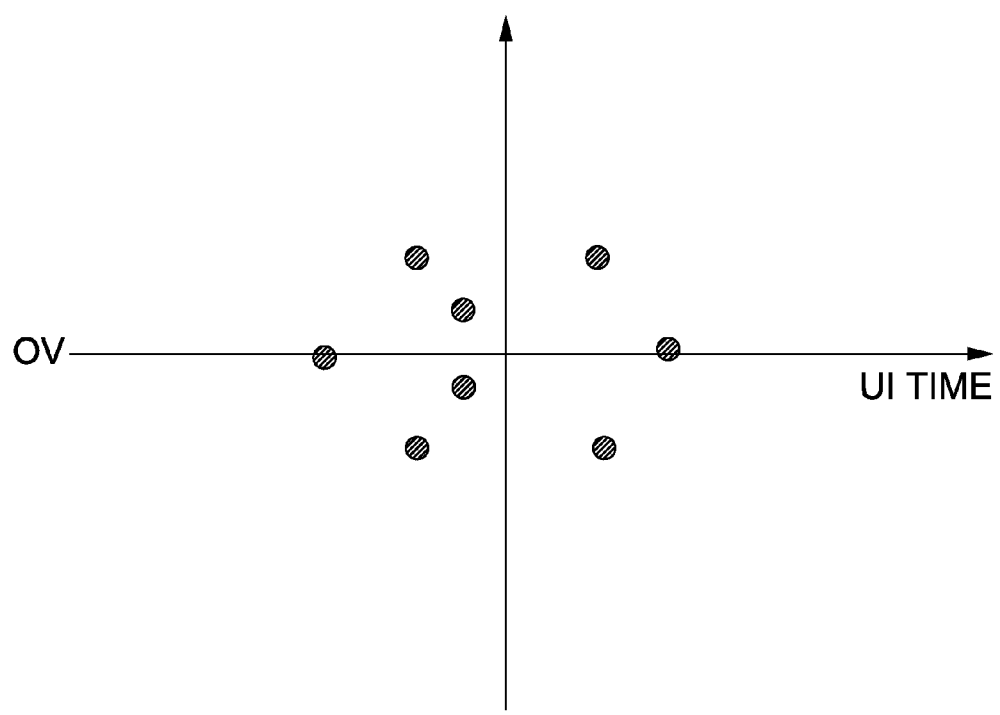
FIG. 16 illustrates an example two-dimensional map of samplers' thresholds according to an embodiment of the present disclosure.

FIG. 16 illustrates an example two-dimensional map of samplers' thresholds according to an embodiment of the present disclosure. The map of FIG. 16 is a result of the outputs of Equation 7.

Embodiments of the present disclosure can also be coupled to a system that evaluates the error and selects the target number of compensation factors based upon a performance criterion, for example making R a variable parameter that is reduced until the errors created by merging levels reaches a pre-defined level. In this case, the final number of samplers may be smaller than the maximal value allowed for R, i.e. the actual number of samplers implemented. This means that unused samplers' outputs will be ignored. Furthermore, said unused samplers can be turned off to reduce their power consumption.

Reducing the number of samplers, as achieved using example embodiments described and illustrated herein, is relevant to reducing the overall receiver power. If the same performance can be achieved using fewer samplers, this is a net power and area gain. Future channels may require larger DFE depths. DFEs are present in many medium and long-reach protocols, such as SAS, PCIe III, 10 G KR, and likely mostly anything above 12 Gbs. For these applications, the present disclosure can often achieve a better performance than most sampled systems for the same DFE depth, while not increasing power significantly. In some cases, the DFE depth can be reduced while keeping the same performance, which usually provides a power benefit.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of operating an unrolled Decision Feedback Equalizer (DFE) having a plurality of input samplers, the method comprising:
 a) creating a reduced set of compensation factors (R) based on an original set of compensation factors ($K^N$) for the unrolled DFE, where $R<K^N$, and where K represents number of bits encoded into each baud, and N represents the DFE depth in number of bauds;
 b) applying the reduced set of compensation factors as input sampler thresholds for the plurality of input samplers to generate a reduced set of unrolled DFE decisions, the number of input samplers being no more than R; and
 c) selecting an appropriate DFE decision from the reduced set of unrolled DFE decisions based upon previous bit values and in accordance with a mapping table, wherein step a) comprises:
  a0) merging the original set of compensation factors until their number reaches a pre-defined target R and keeping track of which levels in the original set of compensation factors were merged together; and
  a1) computing a mapping function to map between the previous bit values and the new input sampler thresholds; creating the mapping table based on the mapping function; and assigning values of a mapping table by assigning an increasing index value for each unique value of the unique index list.

2. The method of claim 1 wherein step b) comprises:
 converting the reduced set of compensation factors into the input sampler thresholds; and
 assigning each of the input sampler thresholds to a sampling head of one of the plurality of input samplers.

3. The method of claim 1 further comprising:
 sorting the original set of compensation factors by compensation factor value;
 selecting half ($K^N/2$) of the sorted set of compensation factors as a basis for creating the reduced set of compensation factors, using symmetry found in the original set of compensation factors, where the reduced set of compensation factors after symmetry reduction, R/2, is less than $K^N/2$; and
 expanding the selected half of the sorted set of compensation factors and the mapping table to a full set of compensation factors and a final mapping table.

4. The method of claim 3 further comprising, if the original set of compensation factors lacks symmetry:
 creating a symmetrical compensation factors list by averaging magnitudes of a non-symmetrical compensation factor list for indexes expected to be symmetrical, and keeping the original sign and offset.

5. The method of claim 1 further comprising, to implement the unrolled DFE:
 compacting a code resulting from the samplers into a smaller number of bits that represent the code; and
 using this compacted code as the input to a digital DFE decision tree, wherein the compensation factors are the mapping table values.

6. The method of claim 1 wherein the reduced set of compensation factors are computed by using Lloyd-Max techniques to minimize a variance of a distribution of an error due to the compensation factor reduction, assuming an equal probability of usage of the compensation factors.

7. The method of claim 6 wherein a known probability of usage of the compensation factors is used to further optimize the variance of the distribution of the error.

8. The method of claim 1 wherein the reduced set of compensation factors comprises compensation factors of a voltage-domain DFE.

9. The method of claim 1 wherein the reduced set of compensation factors comprises compensation factors of a time-domain DFE, which select different sampling instants for a current sample according to previous decisions.

10. The method of claim 1 wherein the original set of compensation factors or the reduced set of compensation factors apply to both a time domain and a voltage domain.

11. The method of claim 10 wherein the number of compensation factors is reduced by a method that takes into account simultaneously an error in the time and voltage domain, using a pre-defined conversion factor between the two.

12. The method of claim 11 wherein the reduction method uses Lloyd-Max techniques.

13. The method of claim 1 wherein a final number of reduced compensation factors is iteratively adjusted down until a minimal performance criterion is met, and the mapping table is adjusted to take into account of extra unused samplers' outputs.

14. The method of claim 13 wherein DFE logic is adjusted to take into account the extra unused samplers' outputs.

15. The method of claim 14 wherein the DFE logic is adjusted to discard the extra unused samplers' outputs.

16. The method of claim 13 wherein the performance criterion is an inverse of a largest magnitude of a difference between the original compensation factors and the corresponding final reduced compensation factors.

17. The method of claim 13 wherein the performance criterion is an inverse of a root-sum square of a difference between the original compensation factors and the corresponding final reduced compensation factors.

18. The method of claim 13 wherein a maximal number of reduced compensation factors is pre-defined.

19. The method of claim 13, further comprising powering down unused samplers.

20. The method of claim 1 wherein the compensation factors are merged using register files and state machines, and wherein step a0) further comprises:
  a) sorting the compensation factors in ascending order, while keeping a list of corresponding previous decisions for the sorted compensation factors list;
  b) assigning a unique index to each element of the sorted compensation factors;
  c) assigning a corresponding weight factor of 1 to each element of the sorted compensation factors;
  d) assigning a corresponding valid flag to 1 to each element of the sorted compensation factors;
  e) computing the differences between the valid sorted compensation factors;
  f) selecting the indexes of the list corresponding to a smallest difference;
  g) merging said indexes through a weighted average, using the weight factors corresponding to the compensation factors being merged;
  h) updating weight factors of the merged cells by increasing their value by one;
  i) setting to zero the valid flag of a smallest index of the two merged sorted compensation factors;
  j) setting a value of the element of the unique index list corresponding to the smallest index of the two merged sorted compensation factors to the value of the element of the unique index list corresponding to a largest index of the two merged sorted compensation factors; and
  k) repeating steps e) through j) until the number of valid compensation factors has reached a desired limit.

21. A non-transitory machine readable medium having stored thereon instructions for execution by a processor to perform a method of operating an unrolled Decision Feedback Equalizer (DFE) having a plurality of input samplers, the method comprising:
  a) creating a reduced set of compensation factors (R) based on an original set of compensation factors ($K^N$) for the unrolled DFE, where $R<K^N$, and where K represents number of bits encoded into each baud, and N represents the DFE depth in number of bauds;
  b) applying the reduced set of compensation factors as input sampler thresholds for the plurality of input samplers to generate a reduced set of unrolled DFE decisions, the number of input samplers being no more than R; and
  c) selecting an appropriate DFE decision from the reduced set of unrolled DFE decisions based upon previous bit values and in accordance with a mapping table, wherein step a) comprises:
    a0) merging the original set of compensation factors until their number reaches a pre-defined target R and keeping track of which levels in the original set of compensation factors were merged together; and
    a1) computing a mapping function to map between the previous bit values and the new input sampler thresholds; creating the mapping table based on the mapping function; and assigning values of a mapping table by assigning an increasing index value for each unique value of the unique index list.

22. An unrolled Decision Feedback Equalizer (DFE), comprising:
  a plurality (R) of input samplers;
  a compensation factors reduction module configured to create a reduced set of compensation factors (R) based on an original set of compensation factors ($K^N$) for the unrolled DFE, where $R<K^N$ and where K represents number of bits encoded into each baud, and N represents the DFE depth in number of bauds;
  a mapping and ordering function configured to apply the reduced set of compensation factors as input sampler thresholds for the plurality of input samplers to generate a reduced set of unrolled DFE decisions, the number of input samplers being no more than R; and
  a mapping function configured to select an appropriate DFE decision from the reduced set of unrolled DFE decisions based upon previous bit values and in accordance with a mapping table,
  wherein the compensation factors reduction module is further configured:
    to merge the original set of compensation factors until their number reaches a pre-defined target R and keep track of which levels in the original set of compensation factors were merged together; and
    to compute a mapping function to map between the previous bit values and the new input sampler thresholds; to create the mapping table based on the mapping function; and to assign values of a mapping table by assigning an increasing index value for each unique value of the unique index list.

* * * * *